United States Patent
Sekimoto et al.

(10) Patent No.: US 12,145,185 B2
(45) Date of Patent: Nov. 19, 2024

(54) PREDICTION SYSTEM OF STRIP CHEW IN HOT ROLLING MILL

(71) Applicant: Toshiba Mitsubishi-Electric Industrial Systems Corporation, Tokyo (JP)

(72) Inventors: Masayasu Sekimoto, Tokyo (JP); Hiroyuki Imanari, Tokyo (JP); Mitsuhiko Sano, Tokyo (JP); Girish Babu Meruva, Bangalore (IN); Sai Prem Kumar Ayyagari, Bangalore (IN)

(73) Assignee: TMEIC CORPORATION, Tokyo (JP)

( * ) Notice: Subject to any disclaimer, the term of this patent is extended or adjusted under 35 U.S.C. 154(b) by 5 days.

(21) Appl. No.: 17/275,205

(22) PCT Filed: Sep. 12, 2019

(86) PCT No.: PCT/JP2019/035971
§ 371 (c)(1),
(2) Date: Mar. 11, 2021

(87) PCT Pub. No.: WO2021/048984
PCT Pub. Date: Mar. 18, 2021

(65) Prior Publication Data
US 2022/0008976 A1 Jan. 13, 2022

(51) Int. Cl.
*B21B 37/68* (2006.01)
*B21B 1/26* (2006.01)
(Continued)

(52) U.S. Cl.
CPC .............. *B21B 37/68* (2013.01); *B21B 1/26* (2013.01); *G05B 13/0265* (2013.01); *G05B 13/048* (2013.01)

(58) Field of Classification Search
CPC .......... B21B 37/68; B21B 1/26; B21B 37/58; G05B 13/0265; G05B 13/048;
(Continued)

(56) References Cited

U.S. PATENT DOCUMENTS

| 5,871,138 A * | 2/1999 | Shishido ............. B21B 15/0085 228/5.7 |
| 6,257,034 B1 * | 7/2001 | Fukumori ................ B21B 1/26 72/201 |

(Continued)

FOREIGN PATENT DOCUMENTS

| CN | 102989839 A * | 3/2013 | |
| CN | 108655190 A * | 10/2018 | ............. B21B 37/68 |

(Continued)

OTHER PUBLICATIONS

Machine Translation of Winter (EP-3293594-A1) (Year: 2018).*

(Continued)

*Primary Examiner* — Alicia M. Choi
*Assistant Examiner* — Vi N Tran
(74) *Attorney, Agent, or Firm* — XSENSUS LLP

(57) ABSTRACT

The prediction system of strip chew collects and stores first data and second data as adaptive model construction data. The first data indicates the occurrence or non-occurrence of the strip chew in an object rolling path and the occurrence point of the strip chew. The second data includes information on a preceding rolling path and attribute information on an object strip. The system constructs an adaptive model using the stored adaptive model construction data, and stores the constructed adaptive model as an adapted model. The system collects prediction data similar to the second data. Then, the system inputs the prediction data to the adapted model to predict the occurrence or non-occurrence of the strip chew in the object rolling path and all or some of the occurrence points of the strip chew before the prediction object strip reaches the object rolling path.

13 Claims, 8 Drawing Sheets

(51) Int. Cl.
*G05B 13/02* (2006.01)
*G05B 13/04* (2006.01)

(58) Field of Classification Search
CPC .... G05B 19/41875; G05B 2219/32182; G05B 2219/32193; G05B 2219/32194; Y02P 90/02
See application file for complete search history.

(56) References Cited

U.S. PATENT DOCUMENTS

| | | | |
|---|---|---|---|
| 10,908,566 B2* | 2/2021 | Gafur | G01B 11/028 |
| 11,247,253 B2* | 2/2022 | Sako | B21B 37/18 |
| 2004/0025558 A1* | 2/2004 | Ziegelaar | B21B 37/28 |
| | | | 72/205 |
| 2007/0106400 A1* | 5/2007 | Mukhopadhyay | B21B 38/00 |
| | | | 700/67 |
| 2010/0121471 A1* | 5/2010 | Higo | B21B 37/58 |
| | | | 700/104 |
| 2014/0007637 A1* | 1/2014 | Hayashi | B21B 37/28 |
| | | | 72/200 |
| 2014/0129023 A1* | 5/2014 | Dagner | G05B 15/02 |
| | | | 700/148 |
| 2017/0326605 A1* | 11/2017 | Yamasaki | B21B 37/76 |
| 2018/0200766 A1* | 7/2018 | Kunieda | B32B 15/01 |

FOREIGN PATENT DOCUMENTS

| | | | | |
|---|---|---|---|---|
| EP | 3293594 A1 * | 3/2018 | | B21B 37/00 |
| JP | H01-205808 A | 8/1989 | | |
| JP | 4-118108 A | 4/1992 | | |
| JP | 2539877 B2 * | 10/1996 | | |
| JP | 2015223616 A * | 12/2015 | | |
| JP | 2018-43255 A | 3/2018 | | |
| JP | 2019074969 A * | 5/2019 | | |
| KR | 20000039754 A * | 7/2000 | | |
| KR | 100660216 B1 * | 12/2006 | | |
| KR | 100675061 B1 * | 1/2007 | | B21C 51/00 |
| TW | 201509557 A * | 3/2015 | | |
| WO | 2012/086043 A1 | 6/2012 | | |

OTHER PUBLICATIONS

Machine Translation of Yanagi (JP 2018043255 A) (Year: 2018).*
Machine Translation of Nakahara (JP 2019074969 A) (Year: 2019).*
Machine Translation for JP-2539877-B2, obtained Sep. 2022 (Year: 2022).*
Machine Translation for KR 20000039754 A, obtained Sep. 2022 (Year: 2022).*
Machine Translation for TW-201509557-A, obtained Sep. 2022 (Year: 2022).*
Hsu, Han-Kai, and Jong-Ning Aoh. "The mechanism of position-mode side guide in correcting camber in roughing process of a hot strip mill." Metals 9.5 (2019): 504. (Year: 2019).*
Machine Translation for KR-100660216-B1, obtained Jan. 2023 (Year: 2023).*
Hol, Camile Wilbert José, et al. "Model predictive controller for strip-tracking during tail-out of the finishing mill." IFAC Proceedings vols. 46.16 (2013): 397-402. (Year: 2013).*
Machine Translation for KR100675061B1, obtained Dec. 2023 (Year: 2023).*
International Search Report and Written Opinion mailed on Oct. 15, 2019, received for PCT Application PCT/JP2019/035971 Filed on Sep. 12, 2019, 7 pages.
Office Action issued on May 13, 2022, in corresponding Indian patent Application No. 202117010611, 6 pages.

* cited by examiner

| Coil | J 1 | J+1 2 | J+2 3 | ... ... | ... ... | ... i | ... ... | | J+1- I-1 | J+1 I |
|---|---|---|---|---|---|---|---|---|---|---|
| 1 | | | | | | | | | | |
| 2 | | | | | | | | | | |
| ... | | | | | | | | | | |
| n | | | | | | | | | | |
| ... | | | | | | | | | | |
| P | | | | | | | | | | |
Standard deviation S (p, 1) is calculated with data from the first 1 seconds (0 to 1 seconds) of the Coil p data.
Standard deviation S (p, 2) is similarly calculated with data between 0.1 and 1.1 seconds.
FIG. 7
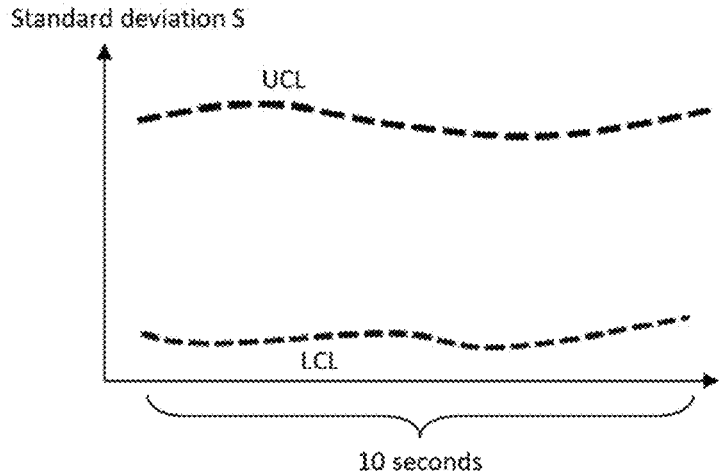
FIG. 8
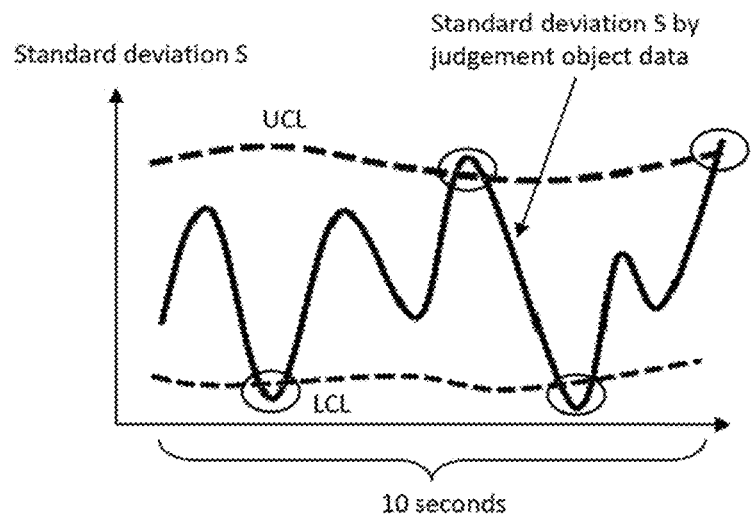
FIG. 9

PREDICTION SYSTEM OF STRIP CHEW IN HOT ROLLING MILL

CROSS-REFERENCE TO RELATED APPLICATION

The present application is based on PCT filing PCT/JP2019/035971, filed Sep. 12, 2019, the entire contents of which are incorporated herein by reference.

TECHNICAL FIELD

The present invention relates to a system for predicting in advance the occurrence of strip chew in hot rolling in which a strip-like metal material is heated to a high temperature and rolled through a plurality of rolling passes.

BACKGROUND ART

A rolling mill rolls and thins lumps of steel materials and non-ferrous materials such as aluminum and copper to make it easy to process them into automobiles and electrical appliances. There are various types of rolling mills, such as a hot strip rolling mill for rolling a strip material, a plate rolling mill, a cold rolling mill, and a rolling mill for rolling a rod and wire. Among them, the hot strip rolling mill in which the strip is batch-wise rolled at high speed is apt to generate strip chew.

FIG. 12 is a diagram showing an example of a configuration of a rolling mill in a conventional hot strip rolling process. The rolling mill 20 shown in FIG. 12 includes various apparatuses such as a heating furnace 21, a roughing mill 22, a bar heater 24, a finishing mill 25, a run-out table 26, and a coiler 27. The strip 100 heated by the heating furnace 21 is rolled by the roughing mill 22. The strip 100 rolled by the roughing mill 22 is conveyed to the finishing mill 25 via the bar heater 24. The strip 100 rolled by the finishing mill 25 is cooled by the run-out table 26, and then coiled into a coil shape by the coiler 27. The final product is a coiled strip made by thinly rolling the strip 100.

The roughing mill 22 shown in FIG. 12 has a rolling stand R1 having upper and lower work rolls, respectively, and a rolling stand R2 having four rolls including upper and lower work rolls and upper and lower backup rolls having a diameter larger than that of the upper and lower work rolls. The finishing mill 25 shown in FIG. 12 has seven rolling stands F1 to F7 arranged in series. In the example shown in FIG. 12, each of the rolling stands F1 to F7 of the finishing mill 25 is composed of two rolls in each of the upper and lower sides, but may be composed of three rolls in each of the upper and lower sides including intermediate rolls which are installed between a work roll and a backup roll. Although the detailed specifications are different, such as a large capacity electric motor for driving the upper and lower rolling rolls and a shaft connecting the rolls and the electric motor, the configurations of the apparatuses are often similar.

Side guides (not shown) are installed on the entrance of the respective rolling stands of the roughing mill 22 and the finishing mill 25. The roughing mill 22 usually stops the strip before rolling, sandwiches and centers the strip by narrowing the opening degree of the side guide, and then rolls the strip. In the finishing mill 25, since the strip often enters the rolling stand at high speed, the opening degree of the side guide is often set in advance by a width obtained by adding a margin to the width of the strip.

The strip chew is a phenomenon that occurs at the head end or the tail end of the strip when the strip steers directly under the rolling stand, that is, moves in the roll width direction or bends in the width direction. The strip chew includes head chew generated at the head end of the strip and tail chew generated at the tail end of the strip. The head chew occurs when the head is caught by the entrance side guide before the strip enters the rolling stand by steering of the strip or bending of the head, and the strip enters the rolling stand while bending the head of the strip. The tail chew occurs when the tail end of the strip steers before passing through the rolling stand, and collides with the entrance side guide, or when the tail end is double bitten and rolled, the load concentrates on the double bitten portion, and the portion is pulled off.

If the strip chew occurs, the roll surface may become flawed. In order to prevent the flaws from being transferred to the surface of the next strip, the operation may be stopped once, and the rolls may be extracted and inspected. Also, a cut edge of the broken strip may remain in the rolling mill. Since the cut edge may disturb stable threading of the strip to be rolled next, inspection is necessary in this case as well. These operations reduce the productivity and, consequently, worsen the roll intensity.

In the roughing mill 22, so-called reverse rolling in which rolling in the forward direction and the reverse direction is repeated is performed for 5 or 6 passes, and in the finishing mill 25, rolling is performed at 6 or 7 rolling stands F1 to F7 straightly. The passage of the strip under the rolling stand once is referred to as one pass. In the roughing mill 22, rolling of a plurality of passes is performed in one rolling stand, and in the finishing mill 25, rolling of only one pass is performed in one rolling stand. Hereinafter, the tail chew in the finishing rolling mill 25 in which the frequency of strip chew generating is particularly high will be described. Here, rolling in one pass and rolling in one stand have the same meaning.

In the conventional hot strip rolling process, the following measures are generally taken for the strip chew.

Countermeasure A: The operator deals with the strip in advance, in which the strip chew is apt to occur.

Countermeasure B: In response to the occurrence of the strip chew, the operator immediately responds.

Countermeasure C: Automatic steering control for suppressing the steering of the tail end is applied.

Strips that are susceptible to strip chew include thinner ones, smaller crown ones, and specific steel types. Especially, in the subsequent stage of the finishing mill where the strip thickness is small and the rolling speed is high, the strip chew is apt to occur. According to the countermeasure A, the operator takes measures against such a strip and such a situation while observing the state of steering of the strip on the upstream side. However, the operator must cope with various situations such as reduction and speed, and the degree of proficiency varies from operator to operator, so that the operator cannot always cope with the situation accurately. In the countermeasure B, the operator tries to correct the steering when it occurs. However, since the steering is a phenomenon that rapidly progresses, it is not always possible for the operator to accurately cope with it.

Although the countermeasure C is effective for suppressing the steering, it is conducted after the steering occurs, and the occurrence of the steering is not predicted in advance. As disclosed in, for example, Patent Literature 1 and Patent Literature 2, steering control has been addressed for some time. The prior arts disclosed in Patent Documents 1 and 2, although they are different from each other in their specific methods, attempt to suppress the steering amount and preventing strip chew by calculating the steering amount of the strip and controlling it by using the calculated steering amount. However, it is also true that the object of the steering control is an unstable system, which is difficult to control, and there is no effective control means.

PRIOR-ART DOCUMENT

Patent Document

[Patent Document 1] JP-A-2018-43255
[Patent Document 2] JP-A-H04-118108

SUMMARY OF THE INVENTION

Problems to be Solved by the Invention

Whether or not the strip chew occurs in the strip rolled in front of the operator's eyes, and where the strip chew occurs, is largely dependent on the operator's experience and intuition, and therefore cannot be accurately predicted. Attempts have been made to construct a physical model of the steering of the strip, which is the cause of the strip chew, but it is still difficult to construct a model with sufficient accuracy. Further, it is difficult to say that the steering control using the model also achieves sufficient performance.

The present invention has been made in view of the above problems, and an object thereof is to provide a prediction system of strip chew capable of predicting whether the strip chew occurs and a point where the strip chew occurs.

Means of Solving the Problems

The prediction system of strip chew according to the present invention is a system for predicting the occurrence of the strip chew, which is a phenomenon that occurs at a head end or tail end of a strip due to steering of the strip or bending of the strip to width direction in a hot rolling mill in which a strip-like metal material is heated to a high temperature and rolled through a plurality of rolling passes, and includes one or more computers. The one or more computers are programmed to perform a process of collecting and storing adaptive model construction data used to construct an adaptive model for predicting occurrence of the strip chew, a process of constructing the adaptive model using the adaptive model construction data, a process of storing an adapted model, which is the adaptive model that has been constructed, a process of collecting prediction data used to predict the occurrence of the strip chew; and a process of predicting the occurrence of the strip chew by inputting the prediction data to the adapted model.

More specifically, in the process of collecting and storing the adaptive model construction data, the one or more computers collect a plurality of sets of first data and second data as the adaptive model construction data, the first data being data which indicates the occurrence or non-occurrence of the strip chew in an object rolling path which is an object of strip chew occurrence prediction and an occurrence point of the strip chew, and the second data being data which includes information on a preceding rolling path preceding the object rolling path in rolling order, which is obtained when a strip linked to the first data is rolled in the preceding rolling path, and attribute information on the same strip. In the process of collecting the prediction data, the one or more computers collect, as the prediction data, data which includes information on a preceding rolling path preceding the object rolling path in rolling order, which is obtained when a prediction object strip is rolled in the preceding rolling path, and attribute information on the same strip. In the process of predicting the occurrence of the strip chew, the one or more computers predict the occurrence or non-occurrence of the strip chew in the object rolling path and all or some of the occurrence points of the strip chew before the prediction object strip reaches the object rolling path.

The one or more computers may be programmed to execute a process of displaying a prediction result of the occurrence of the strip chew on the display device.

The one or more computers may be programmed to execute a process of operating an entrance side guide of the object rolling path when it is predicted that the strip chew occurs in the object rolling path. In the process of operating the entrance side guide, it is possible to specify at which end of the prediction object strip the head end or the tail end the strip chew occurs, and open the entrance side guide at timing when the end at which the strip chew occurs passes the entrance side guide. Also, it is possible to specify on which side of a work side or a drive side of the object rolling path the strip chew occurs, and open the entrance side guide on which the strip chew occurs. If it is not possible to specify on which side of the work side or driving side of the object rolling path the strip chew occurs, the entrance side guides on both sides of the work side and the drive side may be opened.

In the process of constructing the adaptive model, the one or more computers may construct the adaptive model by statistical methods or machine learning that falls within a category of artificial intelligence, and update the adaptive model each time a certain number of new data for constructing the adaptive model are obtained.

In the process of collecting and storing the adaptive model construction data, the one or more computers may determine the occurrence or non-occurrence of the strip chew in the object rolling path and the occurrence point of the strip chew by analyzing image data of the strip passing through the object rolling path. Also, the one or more computers may determine the occurrence or non-occurrence of the strip chew in the object rolling path and the occurrence point of the strip chew based on a load applied to the entrance side guide of the object rolling path. Further, the one or more computers may accept the occurrence or non-occurrence of the strip chew in the object rolling path and the occurrence point of the strip chew input by an operator via an HMI.

Effect of the Invention

According to the prediction system of strip chew according to the present invention, data including information on occurrence or non-occurrence of strip chew is collected, an adaptive model is constructed by machine learning or a statistical method, and by inputting data on the upstream side of a prediction object rolling pass to an adapted model, the occurrence or non-occurrence of the strip chew in a strip to be next rolled and a point where the strip chew occurs are predicted in advance. As a result, it is possible to have a time margin for preparing to prevent or reduce the steering of the strip, which is the cause of the strip chew, before the strip passes through the object rolling pass, and therefore, it is possible to reduce the occurrence of the strip chew and thereby realize the stable operation, and consequently, to improve the roll intensity. In addition, since the prediction is performed based on the actual machine data, there is an advantage that it can follow the change in the situation of the actual machine.

BRIEF DESCRIPTION OF THE DRAWINGS

FIG. 7 is a diagram for specifically explaining an operation outline of an ACC.

FIG. 8 is a diagram for specifically explaining the operation outline of the ACC.

FIG. 9 is a diagram for specifically explaining the operation outline of the ACC.

DESCRIPTION OF EMBODIMENT

Embodiments of the present invention will be described with reference to the drawings. However, the following embodiments exemplify apparatuses and methods for embodying the technical idea of the present invention, and the structure, arrangement, processing order, and the like of the constituent parts are not intended to be limited to those described below, except when specifically stated. The present invention is not limited to the following embodiments, and various modifications can be made without departing from the spirit of the present invention.

First Embodiment

1. Configuration of the Prediction System of Strip Chew

Figures 1, 2:
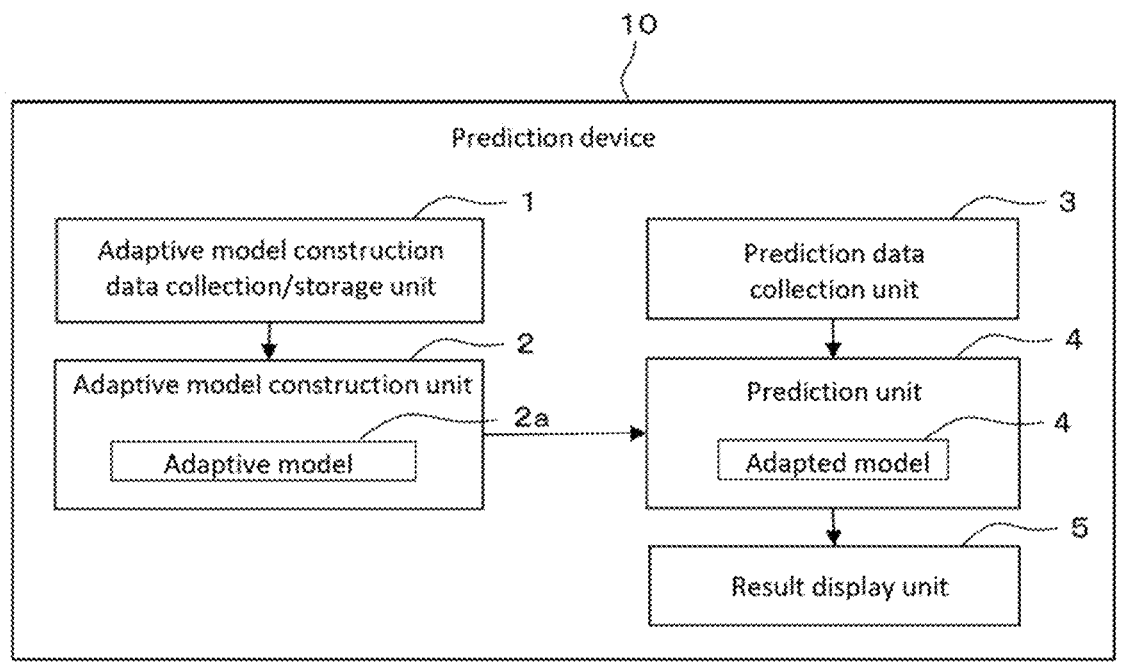
FIG. 1 is a block diagram showing a configuration of a prediction system of strip chew according to a first embodiment of the present invention.
FIG. 2 is a diagram showing an example of an HMI for an operator to input occurrence or non-occurrence of the strip chew and an occurrence point of the strip chew.
Figure 12:
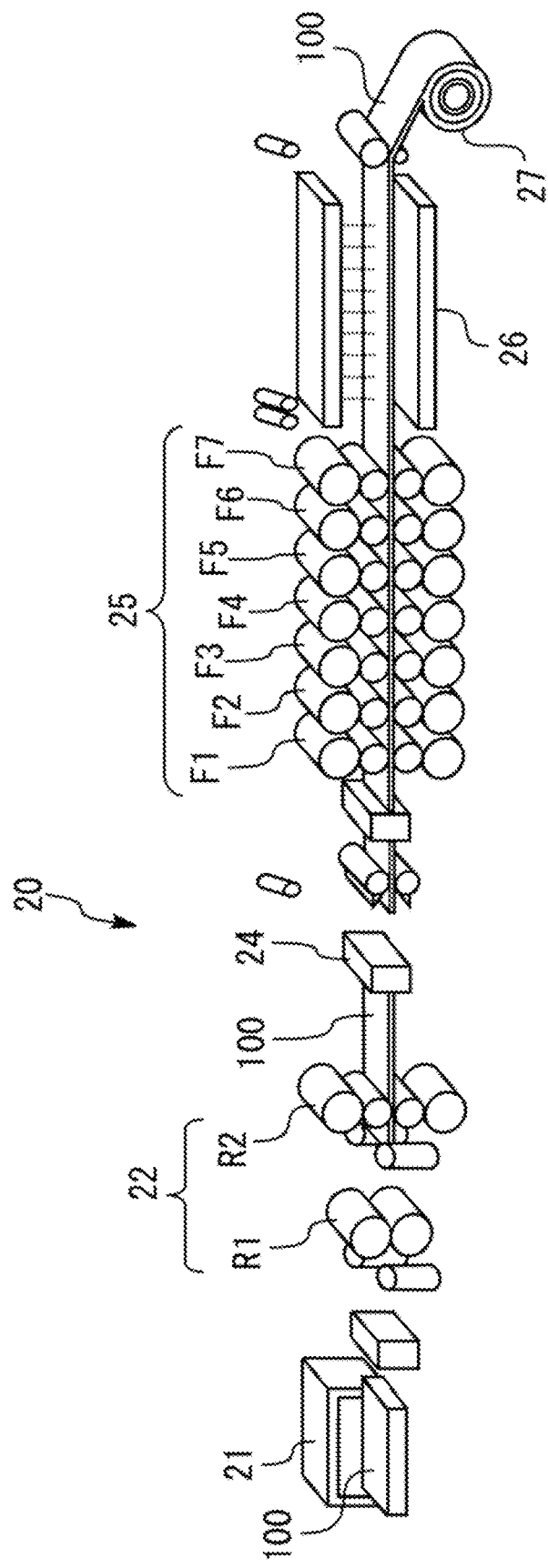
FIG. 12 is a diagram showing an example of a configuration of a rolling mill used for a conventional hot strip rolling process.

FIG. 1 is a block diagram showing a configuration of a prediction system of strip chew according to the first embodiment of the present invention. The prediction system of strip chew of the present embodiment is applied to a hot strip rolling process having the configuration shown in FIG. 12. The prediction system of strip chew includes a prediction device (predictor) 10 that collects and stores data for prediction and performs arithmetic using the data. The prediction apparatus 10 may be composed of a single computer or a plurality of computers connected to a network.

The prediction apparatus 10 includes an adaptive model construction data collection/storage unit 1, an adaptive model construction unit 2, a prediction data collection unit 3, a prediction unit 4, and a result display unit 5. Among these 5に units, the adaptive model construction data collection/storage unit 1, the adaptive model construction unit 2, the prediction data collection unit 3, and the prediction unit 4 are realized by software when a processor executes a program read out from a memory of the computer. Various programs and various data used for strip chew occurrence prediction are stored in the memory. The memory referred to herein includes both a main storage device and an auxiliary storage device. The result display unit 5 is a display device coupled to the computer.

The adaptive model construction data collection/storage unit 1 collects and stores adaptive model construction data for constructing an adaptive model, which will be described later. The adaptive model construction data includes first data and second data. The first data is data indicating occurrence or non-occurrence of a strip chew in a rolling stand (rolling pass) as a strip chew prediction object and an occurrence point of the strip chew. The occurrence point of the strip is classified into a head end and a tail end in the flow direction (longitudinal direction) of the strip, and is classified into a work side (hereinafter referred to as WS) and a drive side (hereinafter referred to as DS) in the widthwise direction of the strip. In the first data, the identification number (ID) of the strip rolled in the object rolling stand and the product information such as the strip thickness and the strip width are associated with each other and stored together with the first data.

The second data is process data including information on a preceding rolling stand preceding the object rolling stand in rolling order, which is obtained when a strip is rolled in the preceding rolling stand, and attribute information on the same strip. The information about the preceding rolling stand includes information about data items such as, for example, a roll gap, a roll shift amount, a rolling load, a gauge meter thickness, and the like, which can be acquired by sensors. In a finishing mill having a total of n rolling stands, the object rolling pass to predict the occurrence of the strip chew, i.e. the object rolling stand, can be, for example, a stand from the m-th stand to the last n-th stand (m n) However, since it is unclear which rolling stand is designated as the object rolling stand in the prediction stage, data of all the stands of the finishing mill is collected and stored. The attributes related to the strip are attributes of the strip rolled in the preceding rolling stand, and refer to an identification number, a steel type, a target strip thickness, a target strip width, a target strip crown, a target flatness, a target temperature, and the like of the strip. The first data and the second data are linked via an identification number of the strip.

The adaptive model construction data collection/storage unit 1 is coupled to an HMI (Human-Machine Interface) (not shown). The first data of the adaptive model construction data includes the occurrence and non-occurrence the strip chew and the occurrence point of the strip chew. These can be entered by the operator via the HMI. The occurrence point of the strip chew is generally WS or DS at the head end or tail end of the strip. However, it is not always easy for the operator to visually determine whether the strip chew has occurred at WS or DS. Therefore, in order to absorb the ambiguity of the eye measurement, it is possible to provide an occurrence point near the center of width (hereinafter referred to as CW) in addition to WS and DS. In order to finely classify and specify the occurrence points, a large number of data to be input to the adaptive model is required, and at this time, it takes a long time to construct the adaptive model. For this reason, performing rough classification of the occurrence points, for example, performing only the classification of the head end and the tail end is allowed.

FIG. 2 is a diagram showing an example of an HMI for the operator to input the occurrence or non-occurrence of the strip chew and the occurrence point of the strip chew, WS and DS shown in FIG. 2 are buttons, which are provided for each of the seven rolling stands F1-F7, and for each of the head end and the tail end. For example, when the operator visually observes that the strip chew has occurred at WS of the tail end in the third rolling stand F3, the operator presses the WS button at F3 column and Tail row. Further, in the HMI shown in FIG. 2, CW buttons for absorbing ambiguity of eye measurement may be added. Alternatively, instead of adding CW buttons, if it is uncertain whether the strip chew has occurred in WS or DS, the same determination as pressing the CW button may be performed by pressing both the WS button and the DS button.

As a method of acquiring the first data for constructing the adaptive model, instead of input by the operator, a method of judging the occurrence and non-occurrence of the strip chew and the occurrence point of the strip chew based on image data can be used. In general, many television cameras are installed in the rolling mill. By capturing an image of the strip passing through the rolling stand by a television camera installed between the rolling stands of the finishing mill and analyzing the obtained image data, it is possible to easily determine whether or not the strip chew occurs at the head end or the tail end of the strip. When the strip chew occurs, the strip is torn, and the high-temperature portion inside the strip appears as a streak. The surface temperature of the strip is lower than that of the inside so that the surface of the strip is visible as a black color. Therefore, the cracked portion is clearly visible as an orange color in the high temperature portion of the inside. In addition, according to the image data, it is easy to determine whether or not the point that collided with the side guide is WS or DS.

As another method of acquiring the first data for constructing the adaptive model, a method of judging by a load applied to the side guide of the rolling stand can be used. The side guide can perform position control or force control, and the force applied to the side guide can be detected by a sensor. The strip chew is often caused by steering of the strip, and if the force applied to the side guide is equal to or greater than a certain threshold value, it can be determined that the strip chew has occurred. In addition, since the force applied to the side guide can be detected independently on the left and right sides, it is possible to determine whether the strip chew has occurred in either of the WS and the DS.

Returning to FIG. 1 again, the description of the configuration of the prediction system of strip chew will be continued. When a predetermined number of data are collected by the adaptive model construction data collection/storage unit 1, the adaptive model construction data collection/storage unit 1 inputs the collected and stored data to the adaptive model construction unit 2. The adaptive model construction unit 2 constructs an adaptive model 2a using the inputted data. The adaptive model is a model in which, when data is input, the relationship between internal components changes and the output changes.

Examples of adaptive models suitable for predicting the occurrence of the strip chew include a neural network (hereinafter referred to as NN) and a self-organizing map (hereinafter referred to as SOM) classified into machine learning, and an adaptive control chart (hereinafter referred to as ACC) using statistical techniques. There are two types of learning methods classified into machine learning: supervised learning and unsupervised learning. In general, NN performs supervised learning, and SOM performs unsupervised learning. These can also be applied to the problem of classifying into two values, such as the occurrence or non-occurrence of the strip chew. The methods of NN, SOM, and ACC are widely known. The outline of these methods will be described later.

Figure 3:
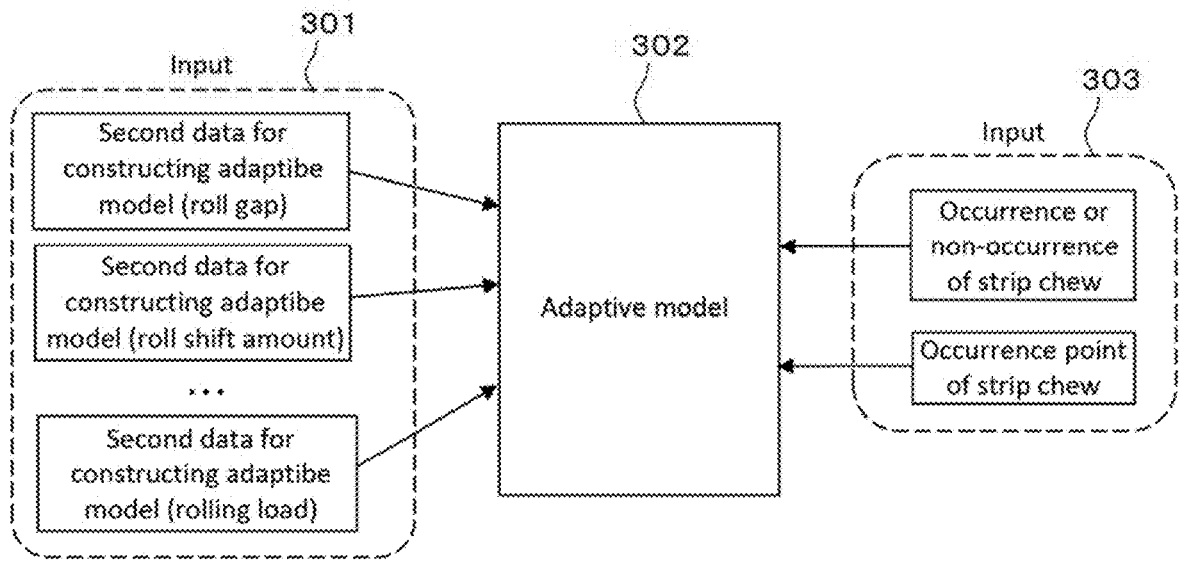
FIG. 3 is a diagram conceptually showing a process performed in the adaptive model construction unit of the prediction system of strip chew according to the first embodiment of the present invention.

FIG. 3 is a diagram conceptually showing a process performed in the adaptive model construction unit 2. The adaptive model construction unit 2 inputs the second data 301 for constructing the adaptive model to the adaptive model 302 (adaptive model 2a shown in FIG. 1). As a result, the relationship between the internal components changes, and construction of the adaptive model 302 proceeds. The adaptive model construction unit 2 inputs the first data 303 for constructing the adaptive model to the adaptive model 302 as training data or verification data. When the first data 303 is used as the training data, the difference between the output of the adaptive model 302 obtained from the second data and the first data 303 is returned to the adaptive model 302 as back propagation.

Returning to FIG. 1 again, the description of the configuration of the prediction system of strip chew will be continued. When the construction of the adaptive model 2a is completed, the adaptive model construction unit 2 stores the constructed adaptive model 2a as the adapted model 4a separately from the adaptive model 2a. The stored adapted model 4a is used in the prediction unit 4 to predict the occurrence of the strip chew. The reason why the adapted model 4a is stored separately from the adaptive model 2a is that the inner states of the adapted model must not change while the strip chew is predicted to occur.

The prediction data collected by the prediction data collection unit 3 is used to predict the occurrence of the strip chew using the adapted model 4a. The prediction data collection unit 3 collects the same type of data as the second data for constructing the adaptive model as the prediction data. That is, the prediction data collection unit 3 collects data including information on the preceding rolling stand preceding the prediction object rolling stand in rolling order, which is obtained when a prediction object strip is rolled in the preceding rolling stand, and attribute information on the same strip, while changing the prediction object rolling stand from the m-th stand to the final n-th stand in order. The prediction data collection unit 3 inputs the collected prediction data to the adapted model 4a.

Figure 4:
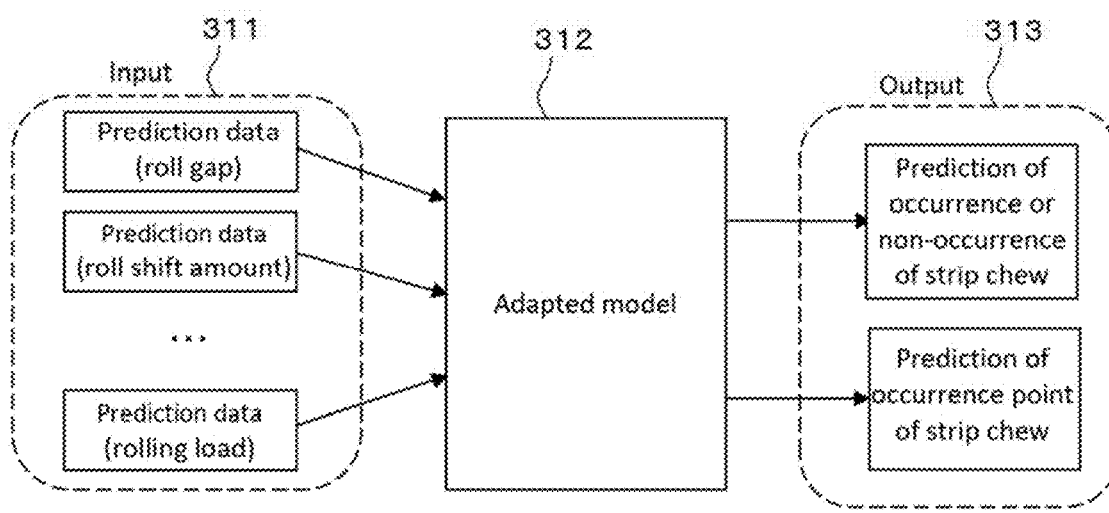
FIG. 4 is a diagram conceptually showing a process performed in the prediction unit of the prediction system of strip chew according to the first embodiment of the present invention.

FIG. 4 is a diagram conceptually showing a process performed by the prediction unit 4. The prediction unit 4 inputs the prediction data 311 to the adapted model 312 (adapted model 4a shown in FIG. 1), and obtains the prediction result of the occurrence or non-occurrence of the strip chew as the output 313 of the adapted model 4a. When the occurrence of the strip chew is predicted, the predicted result of the occurrence point is also obtained as the output 313 of the adapted model 4a. The occurrence point of the strip chew obtained as the prediction result does not necessarily have to be all of the occurrence points, but may be some of the occurrence points. The prediction using the adapted model 312 is performed so that the prediction result is obtained before the prediction object strip reaches the object rolling stand.

Returning to FIG. 1 again, the description of the configuration of the prediction system of strip chew will be continued. The prediction unit 4 outputs the prediction result obtained by the adapted model 312 to the result display unit 5. The result display unit 5 displays the prediction result to the operator in an easy-to-understand manner. By referring to the prediction result displayed on the result display unit 5, the operator can perform an intervention operation for suppressing the occurrence of the strip chew on the prediction object rolling stand.

2. Process Flow of Strip Chew Prediction

Figure 5:
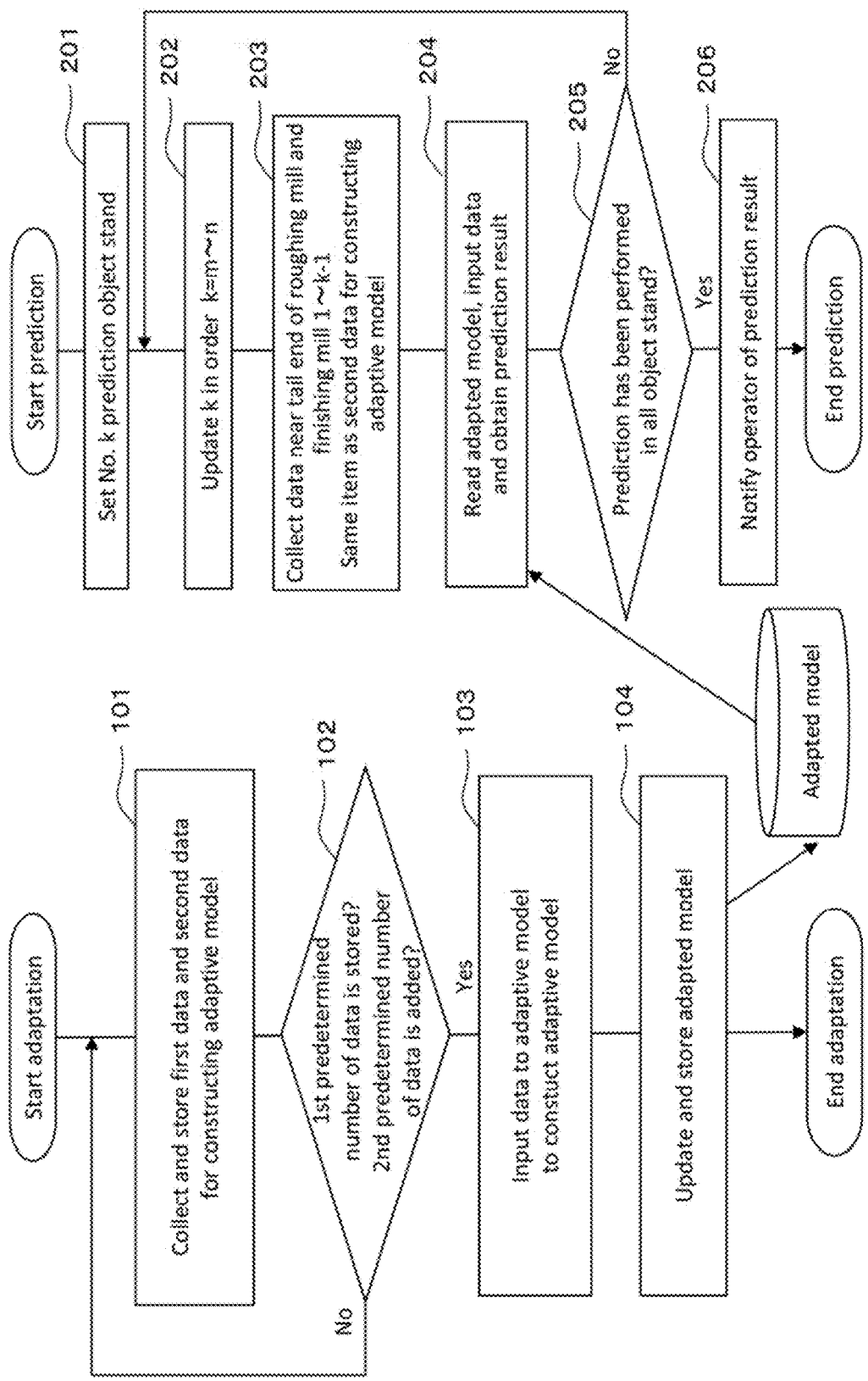
FIG. 5 is a flowchart showing in detail a process flow by the prediction system of strip chew according to the first embodiment of the present invention.

FIG. 5 is a flowchart showing in detail a process flow by the prediction system of strip chew according to the present embodiment. In FIG. 5, the flow chart on the left side of the two flow charts arranged on the left and right side shows the process flow in the adaptive model construction stage, and the flow chart on the right side shows the process flow in the prediction stage.

First, the process flow in the adaptive model construction stage will be described along the flow chart on the left side. In the adaptive model construction stage, step 101 is first performed. In step 101, the first data and the second data for constructing the adaptive model are collected and stored.

Here, the method of collecting the second data will be described in detail. For example, if data is collected to predict the occurrence of the strip chew in the sixth stand F6 of the finishing mill, data near the tail end is collected for each of the stands F1, F2, and F3 on the upstream side of the stand F6. The data items of the data to be collected are a roll gap, a roll shift amount, a rolling load, a gauge meter thickness, and the like. However, WS, DS, and center data are collected for the roll gap, and WS and DS data are collected for the rolling load.

Collecting data near the tail means collecting data for a period of time sufficient for the prediction process to be performed and for the prediction result to be informed to the operator, e.g., data for 30 seconds from the tail end of the strip to the head end, and 10 seconds upstream therefrom. In other words, the first 10 seconds of data of the 40 seconds of data near the tail end are collected. In this case, an adaptive model is constructed using the collected 10 second data. The time of 30 seconds is an example of a time approximately equal to the sum of the time for the prediction process and the time for the operator to be notified and prepare to avoid the strip chew. By securing such a time, before the prediction object strip reaches the prediction object rolling stand, it is possible to predict the occurrence or non-occurrence of the strip chew in the prediction object rolling stand and all or some of the occurrence points of the strip chew, notify the operator of the prediction result, and prompt the operator to prepare to avoid the strip chew.

It should be noted that, depending on the method of machine learning and the statistical method to be described later, better accuracy may be obtained when all items of the collected second data or all data of the collected time are not used. For this reason, the prediction system of strip chew of the present embodiment is configured to have a mechanism capable of appropriately and selectively using necessary data from data collected as the second data.

In step 102, it is determined whether or not the first predetermined number or more of data have been accumulated, or whether or not the second predetermined number or more of data have been added. Here, the first predetermined number is an absolute number of data sufficient to apply machine learning or statistical techniques. In the case of machine learning, data of 3,000 to 10,000 or more are generally required, although this is different depending on the method. The second predetermined number is necessary for judging to update the adaptive model with the newly added data, since the data increases as the rolling progresses. This can be chosen arbitrarily, and the smaller the number, the more frequently it is updated, but the greater the computational load. If more is set, the update frequency is reduced, but there is a fear that it may not be possible to follow the new situation of rolling.

The collection and storage of the first and second data for constructing the adaptive model is continued in step 101 until the condition of step 102 is satisfied. If the condition of step 102 is satisfied, the flow proceeds to step 103. Step 103 is the main process for constructing the adaptive model. The adaptive model implemented by a method such as NN, SOM, or ACC is updated in its internal state by input data so that a more accurate prediction can be made.

In step 104, the constructed adaptive model is saved as an adapted model. If an existing adapted model constructed using old data exists, the existing adapted model is updated with the adaptive model constructed this time, and the updated adapted model is stored.

Next, the process flow in the prediction stage will be described along the flow chart on the right side. In the prediction stage, step 201 is first performed. In step 201, the stand number (k) of the prediction object stand is set. Since the strip chew is likely to occur in the post-stage of the finishing mill, the stand number (k) may be only 4, 5, 6, 7. In step 202, the stand number (k) is updated and reset one by one each time it is executed.

In step 203, the prediction data is acquired by the same collection method as the second data for constructing the adaptive model described in step 101. The preceding rolling stand for collecting the prediction data needs to be determined in consideration of the time required for the prediction processing, the time required for notifying the operator via the display device, and the time required for the operator to prepare for the strip chew avoidance operation. The following table shows an example of the correspondence between the prediction object rolling stand (described as Prediction object stand in the table) and the preceding rolling stand from which the prediction data is collected (described as Predicted data collection stand in the table).

TABLE 1

| Prediction object stand | Predicted data collection stand |
|---|---|
| F7 | F1, F2, F3 or F1, F2 |
| F6 | F1, F2, F3 or F1, F2 |
| F5 | F1, F2 |
| F4 | F1, F2 |

In step 204, the adapted model stored in step 104 is read, and prediction data is input to the adapted model. From the adapted model, for each prediction object stand, a prediction result of the occurrence or non-occurrence of the strip chew is output, and when the strip chew occurs, a prediction result of the occurrence point of the strip chew is also output.

In step 205, it is confirmed whether or not prediction has been performed in all the prediction object stands. The processes from step 202 to step 204 are repeated until the prediction on all the prediction object stands is completed. When the prediction is completed on all the prediction object stands, the process proceeds to step 206, and the prediction result is notified to the operator. At this time, the operator in the cab is often either looking at the actual rolling condition beyond the glass or looking at the television monitor installed in the cab. For this reason, it is desirable that the notification of the prediction result is displayed in the two easy-to-see places. In step 205, the prediction result is notified to the operator after all object stands have been predicted, but the notification to the operator may be performed every time the strip chew is predicted to occur. That is, when the prediction is started from the m-th stand, if it is predicted that the strip chew is occur at the m-th stand, the fact may be notified immediately, and then the prediction for the m+1-th stand may be performed.

3. Adaptive Model for Prediction of Strip Chew Occurrence 3-1. NN

In the simplest configuration, the NN has a three-layer structure of an input layer, an intermediate layer, and an output layer, and the number of intermediate layers can be increased. When the intermediate layer is composed of a large number of layers, deep learning can be performed. Each layer is composed of one or more neurons, and the neurons of each layer are connected by weighted lines. One neuron changes its output state depending on the level of the input value. In the case of supervised learning, a method called back propagation is generally used in which the output of the NN and the supervised signal are compared and the weights of the connecting lines are updated in the opposite direction.

3-2. SOM

Figure 6:
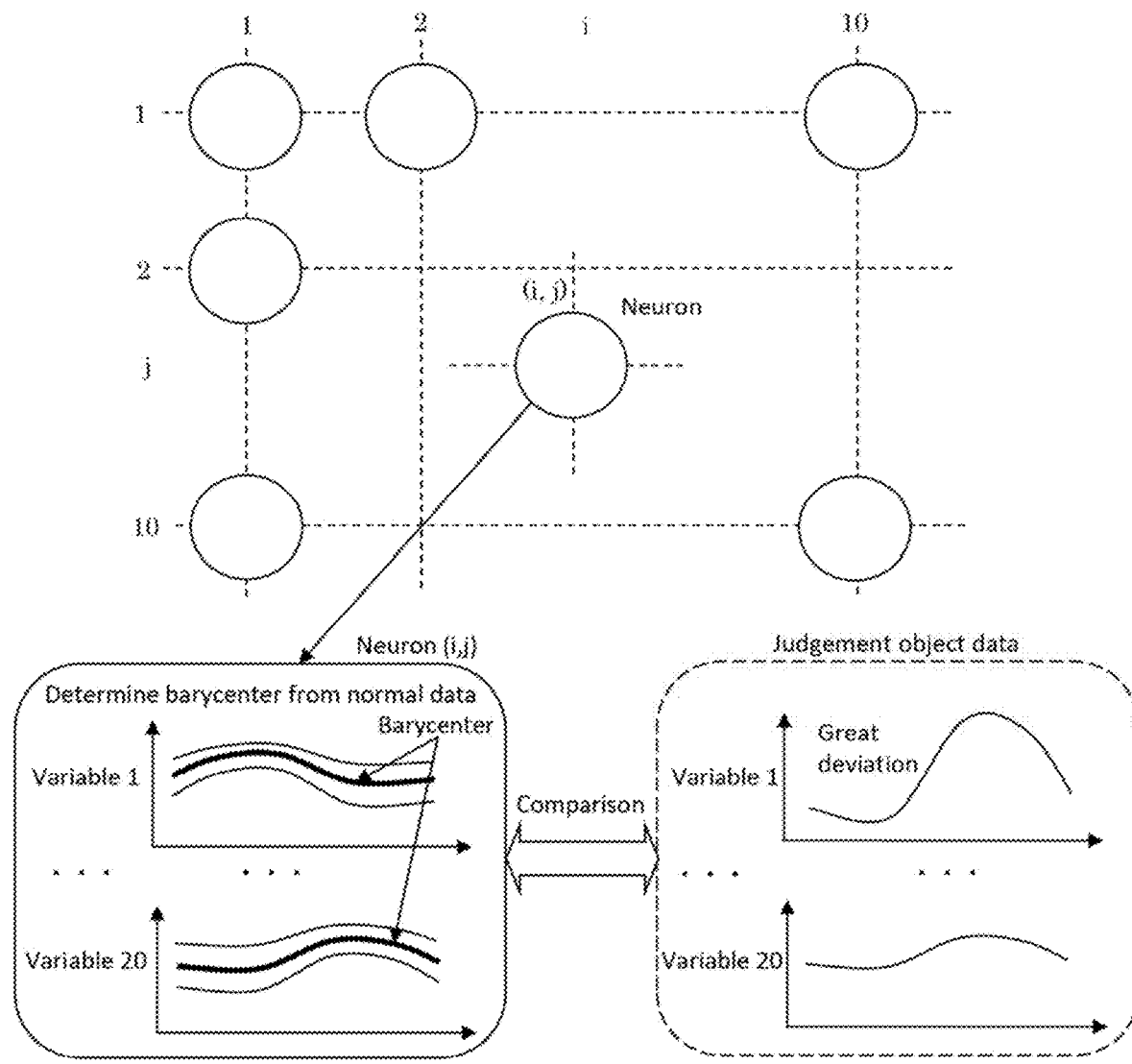
FIG. 6 is a diagram illustrating an example of a configuration of a SOM and an outline of a prediction method using the SOM.

The SOM does not require training data, and only normal data, that is, data collected when no strip chew occurs, is used. Defining SOM partitions as 5×5, 10×10, 25×25, etc., each partition is a single neuron. Each neuron is provided with as many planes as the number of variables used. FIG. 6 is a diagram illustrating an example of the configuration of the SOM and an outline of a prediction method used in the SOM. In the configuration example of the SOM shown in FIG. 6, the SOM is composed of 10×10 neurons.

For each neuron, planes corresponding to the number of variables are prepared. Here, it is assumed that the number of data items such as the roll gap and the rolling load included in the second data is 20. Each neuron is provided with a plane for twenty variables, in particular a plane having an axis of values of the variables and an axis of time. Each of the 20 variables has data for 10 seconds corresponding to the vicinity of the tail end of the strip, as described in step 101 of the process flow shown in FIG. 5.

In the adaptive model construction stage, i.e. in the learning stage, a curve of 10 seconds in the initial plane in each neuron is given randomly. Needless to say, constraints such as not overlapping are given to each neuron. In addition, 20 variables of normal data are stored as one set for 10 seconds. The data is retrieved one set at a time, and it is determined which neuronal curve is closest to the entire set of data. Then, it is determined that the one set of data belongs to the neuron determined to be the closest. Similar processing is performed on all sets of normal data, and finally, a curve serving as a barycenter is determined for each variable in each neuron. The construction, i.e., learning, of the adaptive model is completed by the above process.

In the prediction stage, that is, in the normal/abnormal judgment stage, the respective variable values of the prediction data as the judgment object data are compared with the barycentric values of the respective variable values in the 100 neurons. Then, it is calculated which neuron as a whole is close to the judgment object data, and the neuron judged to be the closest is selected. Next, the distance between the curve of the barycenter of each variable in the selected neuron and each variable value of the judgment object data is calculated, and if there is a variable whose distance deviates greatly from the other (in the above example, variable 1 in FIG. 6), the data including it is regarded as abnormal. That is, it is determined that the strip chew has occurred.

The following table shows a verification example of a learning effect when an adaptive model is constructed by the SOM using normal data and abnormal data is detected by using an adapted model. In this verification example, all 7,650 pieces of data of the same steel type included 136 pieces of abnormal data having tail chews, and 100% of the abnormal data could be detected. By using this adapted model, it is possible to predict whether or not the strip chew occurs with an accuracy close to 100%.

TABLE 2

| Learning results of total 7,650 pieces of specific steel type | Verification of Learning Effects: Predicted Results | |
|---|---|---|
| (including 136 tail chews) | Tail chew not occur | Tail chew occur |
| Facts   Tail chew not occur | 7,514 | 0 |
| Tail chew occur | 0 | 136 |

3-3. ACC

The ACC is basically a method of applying a well-known control chart. The control chart fixes the upper control limit (hereinafter referred to as UCL) and the lower control limit (hereinafter referred to as LCL) but the ACC changes them according to the transition of the data. Assuming that there is certain time series data and that the time period shows a transition for 10 seconds, for example, the aiming is shifted every 0.1 second to make a section with one second from the aiming, and the UCL and the LCL in each section are determined from the standard deviation in each section. At this time, if there is skewness in the data, the UCL and the LCL are also corrected based on the skewness. The methods for correcting them are described in "Betul Kan, and Berna Yazici" The Individuals Control Chart in Case of Non-Normality", Journal of Modern Applied Statistical Methods, Vol. 5, Issues 2, Article 28, Digital Commons @WayneState (2005)".

Hereinafter, the outline of the operation of the ACC will be described in more detail with reference to FIGS. 7 to 9, taking the detection of the tail chew as an example. In the adaptive model construction stage, as in the case of the SOM, the normal data for 10 seconds near the tail end of the 20 selected variables is used as the data for constructing the adaptive model. The 10 seconds near the tail end means a period of 10 seconds toward the tip end from a period of 30 seconds from the tail end. In other words, it means the first 10 seconds of the 40 seconds near the tail end.

Assume that data is taken as shown in the table shown in FIG. 7. The columns of the table are coil numbers and the rows are data numbers. The number of coils is P. Of the data of one coil, J is the head number of the data for 10 seconds, and J+I is the last number of the data for 10 seconds. Thus, the 10 second data includes I data. Assuming that the data is recorded every 0.1 second, I=10/0.1=100 in this case.

In the table, frames are drawn in the row of the coil number p, and each frame indicates a window for calculating the standard deviation. The standard deviation of the data is calculated while shifting the window every 0.1 second, using the window for calculating the standard deviation as an interval of one second. Such calculations are performed for all 20 variables of the P normal coils. Then, P standard deviations in each time span such as 0-1 sec, 0.1-1.1 sec, etc. are obtained, and the distribution of the standard deviations is obtained. For example, the standard deviation in time span 1 is obtained as S[1,1], S[2,1], . . . , S[P, 1]. By calculating the standard deviation σ[i] of the standard deviation S[1−P,i] in the same time span i, the UCL can be taken, for example, three times or four times the plus side of σ[i], and the LCL can be taken, for example, three times or four times the minus side of σ[i]. As a result, the UCL and the LCL as shown in FIG. 8 are obtained. However, FIG. 8 shows the UCL and the LCL for one variable, and the UCL and the LCL are calculated for each variable. In the ACC, the determination of the UCL and the LCL corresponds to the construction of the adaptive model.

In the prediction stage, as shown in FIG. 9, the judgment object data is compared with the UCL and the LCL determined in the constructing stage of the adaptive model. Then, by using the number of points of data exceeding the UCL or the LCL and the sum of distances from the UCL or the LCL as evaluation values, it is evaluated how far the judgment object data is separated from the UCL or the LCL, and it is determined whether it is normal or abnormal.

In the NN, both the abnormal data acquired when the strip chew occurs and the normal data acquired when the strip chew doesn't occur are input, and a model is constructed by the NN. On the other hand, in the SOM and the ACC, a model is constructed by inputting only normal data acquired when the strip chew doesn't occur, and it is judged that the strip chew occurs when there is a large deviation from the model. In general, the number of strips in which the strip chew occurs is much less than the number of strips in which the strip chew does not occur. Also, in the operation of equipment, the time during which the equipment is operating normally is much longer than the time during which the equipment is in an abnormal state. Therefore, the data indicating the abnormality is usually much smaller than the data indicating the normality. In such a situation, it is often advantageous to construct a model using data of a normal state by the SOM or the ACC, and to determine that a state other than the normal state is abnormal.

3-4. Characteristics of Each Adaptive Model

The adaptive model is defined as a model in which, when data is input, the relationship between internal components changes and the output changes. An example is an adaptive model constructed by the method like the NN, the SOM, and the ACC. More specifically, suitable adaptive models for the prediction of strip chew occurrence include adaptive models defined by the following definitions A, B, and C.

(A) A model in which the relationship between internal components changes and the output changes when data is input. The model learns from a plurality of sets of inputs and outputs, evaluates the object input, and outputs an evaluation value.

(B) A model in which the relationship between internal components changes and the output changes when data is input. The model learns from a plurality of sets of inputs, evaluates the object input, and outputs an evaluation value.

(C) A model in which the relationship between internal components changes and the output changes when data is input. The model determines a statistical index based on a plurality of sets of inputs, evaluates the sets of inputs, and outputs an evaluation value.

The NN is an example of an adaptive model defined in definition A. The SOM is an example of an adaptive model defined in definition B. The ACC is an example of an adaptive model defined in definition C. The following table shows the relationship of each of the NN, the SOM and the ACC to the definition of the corresponding adaptive model.

TABLE 3

|  | NN | SOM | ACC |
| --- | --- | --- | --- |
| Internal components | Neurons, connecting lines between neurons | Neurons, barycenter of each plane within neuron | UCL and LCL for each variable |
| Relationship | Binding weights between neurons | Value of barycenter of each plane within neuron | Values of UCL and LCL for each variable |
| Inputs at adaptation stage | Second data for adaptive model construction (both data when strip chew occurs and data when no strip chew occurs), data equivalent to first data | Second data for adaptive model construction (data when no strip chew occurs) | Second data for adaptive model construction (data when no strip chew occurs) |
| Inputs at prediction stage | Prediction object data (data equivalent to second data for adaptive model construction) | Prediction object data (data equivalent to second data for adaptive model construction) | Prediction object data (data equivalent to second data for adaptive model construction) |
| Output at prediction stage | data equivalent to first data for adaptive model construction | data equivalent to first data for adaptive model construction | data equivalent to first data for adaptive model construction |

4. Modification of Process Flow of Strip Chew Prediction

Figure 10:
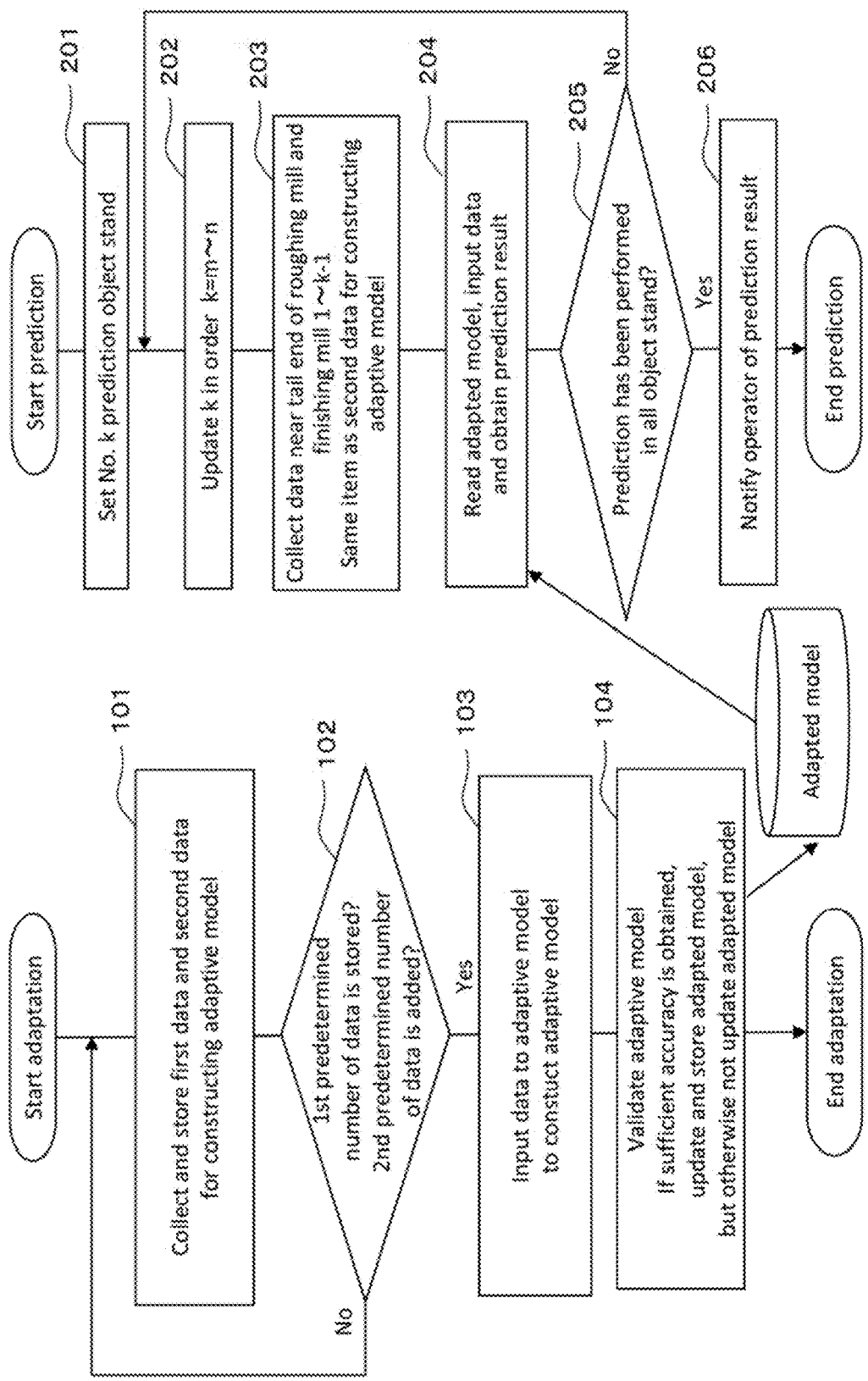
FIG. 10 is a flowchart showing a modification of the process flow by the prediction system of strip chew according to the first embodiment of the present invention.

FIG. 10 is a flowchart showing a modification of the process flow by the prediction system of strip chew of the present embodiment. The difference between the process flow shown in FIG. 5 and the process flow shown in FIG. 10 is in the process flow of the adaptive model construction stage. More specifically, the process of step 104 in the process flow shown in FIG. 5 is replaced with the process of step 104a in the process flow shown in FIG. 10. Step 104a is a step for confirming whether the prediction accuracy based on the adaptive model is secured though the adaptive model is updated in the adaptive model construction stage. If the accuracy of the newly constructed adaptive model is sufficient, the adapted model is updated and saved, otherwise it is not saved.

The methods for verifying the constructed adaptive model differ slightly in the three methods described above. In the NN, learning data and verification data are separated. For example, if there are 10,000 pieces of data, 500 pieces or 1,000 pieces of data are randomly selected as the verification data among 10,000 pieces of data, and the remaining pieces of data are set as the learning data. The verification data is input to the model based on the NN learned by the learning data, and it is verified whether the occurrence of the strip chew can be predicted with high accuracy. In the SOM or the ACC, only abnormal data is used for verification because the model is constructed with normal data acquired when no strip chew occurs. If the abnormal data is input to the model constructed by the SOM or the ACC and it can be determined that the strip chew has occurred, it can be determined that the model is a high-precision model.

Second Embodiment

Next, the prediction system of strip chew according to the second embodiment of the present invention will be described. In the present embodiment, after the occurrence of the strip chew is predicted, the prediction result is not only notified to the operator but also used for the control of the entrance side guide. The prediction system of strip chew of the present embodiment includes a controller that operates the entrance side guide of the prediction object rolling stand when the prediction device predicts that a strip chew will occur in the prediction object rolling stand. The computer functioning as the controller may be a separate computer from the computer functioning as the prediction device. In addition, one computer may be caused to function as the prediction device and may also be caused to function as the controller by software.

Figure 11:
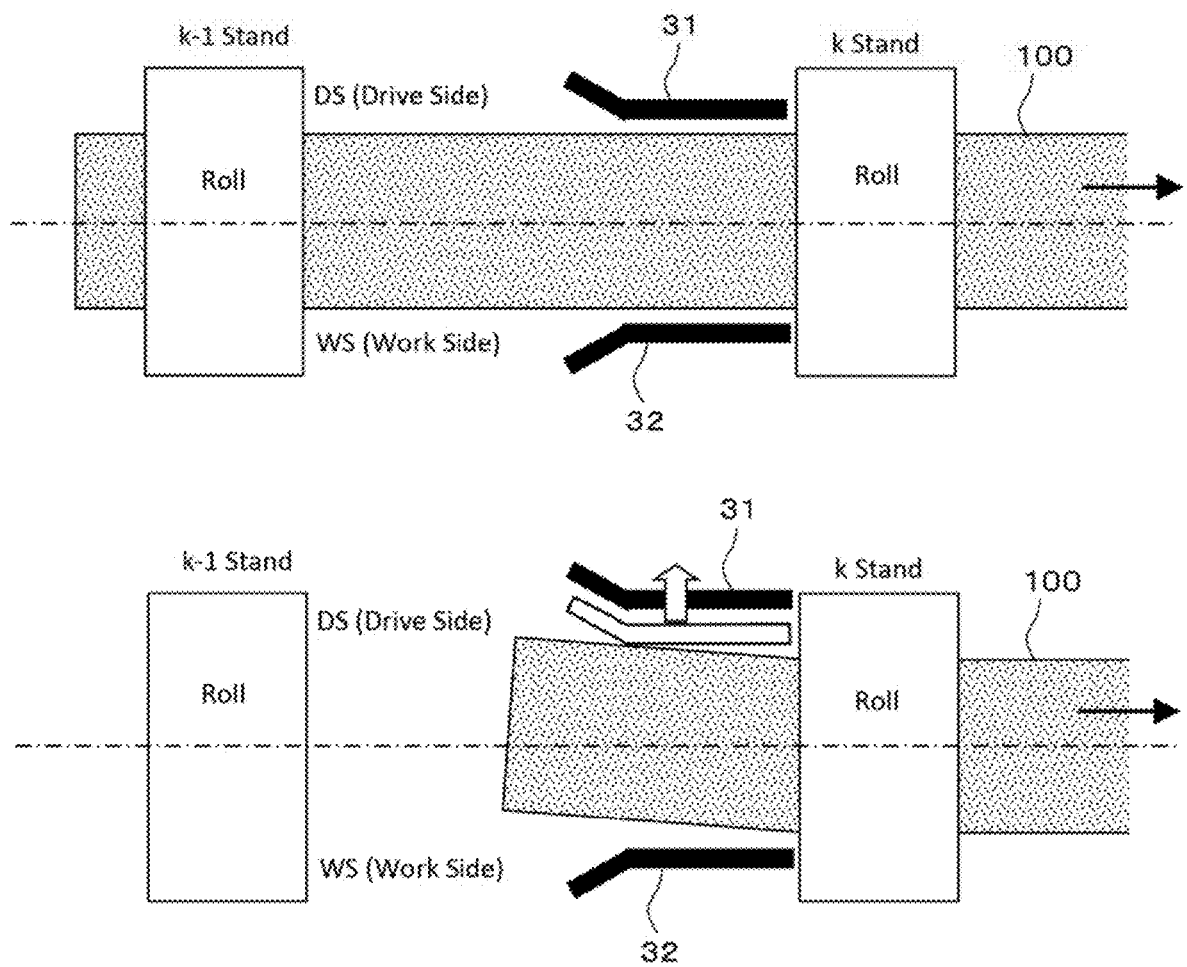
FIG. 11 is a diagram showing an example of entrance side guide control using a strip chew prediction result according to the prediction system of strip chew according to a second embodiment of the present invention.

FIG. 11 is a diagram showing an example of the control of the entrance side guides 31 and 32 using the strip chew prediction result. Here, a control example in the case where the tail chew occurs in the k-th stand and the position is predicted to be DS will be described. In the state shown in the upper part of FIG. 11, the strip 100 is rolled at the k−1-th stand. At this time, steering has not yet occurred. Then, the state becomes the state shown in the lower part after the elapse of time. It is assumed that the strip 100 steers after the tail end passes through the k−1-th stand. One example in which tail chew is expected to occur is when the strip 100 is in such a state. At this time, the controller (not shown) performs an operation of opening the entrance side guide 31 of the DS in accordance with the passage of the tail end in order to prevent the tail end from hitting the entrance side guide to break. When it is not possible to specify on which side of WS and DS the strip chew occurs, the controller (not shown) performs an operation of opening the entrance side guides 31 and 32 on both sides of WS and DS in accordance with the passage of the tail end.

In the example shown in FIG. 11, a case in which the tail chew occurs is assumed, but the same control can be performed in a case in which the head chew occurs. That is, the controller (not shown) performs an operation of opening the entrance side guide in accordance with the passage of the head when the head chew is predicted to occur. The opening operation is performed to the entrance side guide on the side where the strip chew occurs, but when the occurrence point of the strip chew is not specified in WS or DS, the operation of opening the side guides on both sides of WS and DS is performed.

The control as described above is performed on the entrance side guide of the prediction object rolling stand, whereby the operator can be assisted and stable operation can be realized.

Other Embodiments

In the above embodiment, the description has been given for the finishing mill, but the present invention is also applicable to the roughing mill. In the roughing mill, so-called reverse rolling in which rolling in the forward direction and the reverse direction is repeated is performed a plurality of times. When the present invention is applied to the roughing mill, the rolling pass means each rolling, and the preceding rolling pass preceding in the rolling order means the rolling performed before the previous time.

In the above embodiment, the tail chew is mainly explained, but the present invention can be applied not only to the tail chew but also to the head chew.

In addition, although the NN, the SOM, and the ACC have been described as examples of the adaptive model construction method, the adaptive model construction method that can be applied to the present invention is not limited thereto. For example, a Random Forest (RF) to which the idea of a search tree is applied, an Extra Trees which is an evolved form of RF, a xgboost, or the like, can be applied.

EXPLANATION OF CODES

1: Adaptive Model Construction Data Collection/Storage Unit
2: Adaptive Model Construction Unit
2a, 302: Adaptive Model
3: Prediction Data Collection Unit
4: Prediction Unit
4a, 312: Adapted Model
5: Result Display Unit
10: Prediction Device
31, 32: Entrance Side Guide
100: Strip

The invention claimed is:

1. A prediction system comprising:
a memory configured to store adaptive model construction data; and
circuitry configured to
    collect the adaptive model construction data used to construct an adaptive model for predicting occurrence of a strip chew in a hot rolling mill in which a strip-like metal material is heated to a high temperature and rolled through a plurality of rolling paths, the strip chew being a phenomenon in which a tail end of a strip is bent by colliding with an entrance side guide of at least one of the plurality of rolling paths due to a meander of the strip under the at least one of the plurality of rolling paths, by collecting a plurality of sets of first data and second data as the adaptive model construction data, the first data being data which indicates the occurrence or non-occurrence of the strip chew in an object rolling path which is an object of strip chew occurrence prediction and an occurrence point of the strip chew, the second data being data which includes information on a preceding rolling path preceding the object rolling path in rolling order, which is obtained when a strip linked to the first data is rolled in the preceding rolling path, and attribute information on the same strip, the information on the preceding rolling path being information which includes a roll shift amount, and the attribute information on the same strip being information which includes at least one of a target strip crown, a target flatness, and a target temperature of the strip,
    construct the adaptive model using the adaptive model construction data,
    store an adapted model, which is the adaptive model that has been constructed, collect prediction data used to predict the occurrence of the strip chew, by collecting, as the prediction data, data which includes information on one or more preceding rolling paths preceding the object rolling path in rolling order, which is obtained when a prediction object strip is rolled in the one or more preceding rolling paths, and the attribute information on the same strip, predict, during a hot rolling process which is after start of operation of the hot rolling process, before the prediction object strip reaches the object rolling path, the occurrence of the strip chew by inputting the prediction data to the adapted model, while the tail end of the strip has not meandered at the preceding rolling path preceding the object rolling path in the rolling order by predicting the occurrence or non-occurrence of the strip chew in the object rolling path and all or some of the occurrence points of the strip chew, based on the prediction data collected at the preceding rolling paths preceding two or more from the object rolling path, in which the tail end of the strip has not meandered at the preceding rolling paths, and control to open an entrance side guide of the object rolling path before the prediction object strip passes the entrance side guide of the object rolling path, based on the predicted occurrence of the strip chew, to avoid collision of the tail end of the strip with the entrance side guide of the object rolling path.

2. The prediction system according to claim 1, wherein the system further comprises a display device, and the circuitry is configured to execute a process of displaying a prediction result of the occurrence of the strip chew on the display device.

3. The prediction system according to claim 1, wherein the circuitry is configured to specify at which end of the prediction object strip a head end or the tail end the strip chew occurs, and control to open the entrance side guide at timing when the end at which the strip chew occurs passes the entrance side guide.

4. The prediction system according to claim 1, wherein the circuitry is configured to specify on which side of a work side or a drive side of the object rolling path the strip chew occurs, and control to open the entrance side guide on which the strip chew occurs.

5. The prediction system according to claim 1, wherein the circuitry is configured to control to open the entrance side guides on both sides of a work side and a drive side if it is not possible to specify on which side of the work side or driving side of the object rolling path the strip chew occurs.

6. The prediction system according to claim 1, wherein the circuitry is configured to construct the adaptive model by statistical methods or machine learning that falls within a category of artificial intelligence, and update the adaptive model each time a certain number of new data for constructing the adaptive model are obtained.

7. The prediction system according to claim 1, wherein the circuitry is configured to determine the occurrence or non-occurrence of the strip chew in the object rolling path and the occurrence point of the strip chew by analyzing image data of the strip passing through the object rolling path.

8. The prediction system according to claim 1, wherein the circuitry is configured to determine the occurrence or non-occurrence of the strip chew in the object rolling path and the occurrence point of the strip chew on the basis of a load applied to the entrance side guide of the object rolling path.

9. The prediction system according to claim 1, wherein the circuitry is configured to accept the occurrence or non-occurrence of the strip chew in the object rolling path and the occurrence point of the strip chew input by an operator via a HMI.

10. The prediction system according to claim 1, wherein the circuitry is configured to predict that a head end or the tail end of the strip meanders after passing through the preceding rolling path preceding the object rolling path in the rolling order, while the head end or the tail end of the strip has not meandered at the preceding rolling path preceding the object rolling path in the rolling order.

11. The prediction system according to claim 1, wherein the hot rolling mill includes a plurality of rolling stands, each corresponding to each one of the plurality of rolling paths, and
wherein the circuitry is configured to determine that the strip chew at a head end of the strip occurs when the head end of the strip is caught by the entrance side guide before the strip enters an object rolling stand and the strip enters the object rolling stand with bending the head of the strip by the meander of the strip,
wherein the circuitry is configured to determine that the strip chew at the tail end of the strip occurs when the tail end of the strip collides or when the tail end of the strip is double bitten and rolled with the entrance side guide by the meander of the strip.

12. A prediction method comprising:
collecting the adaptive model construction data used to construct an adaptive model for predicting occurrence of a strip chew in a hot rolling mill in which a strip-like metal material is heated to a high temperature and rolled through a plurality of rolling paths, the strip chew being a phenomenon in which a tail end of a strip is bent by colliding with an entrance side guide of at least one of the plurality of rolling paths due to a meander of the strip under the at least one of the plurality of rolling paths, by collecting a plurality of sets of first data and second data as the adaptive model construction data, the first data being data which indicates the occurrence or non-occurrence of the strip chew in an object rolling path which is an object of strip chew occurrence prediction and an occurrence point of the strip chew, the second data being data which includes information on a preceding rolling path preceding the object rolling path in rolling order, which is obtained when a strip linked to the first data is rolled in the preceding rolling path, and attribute information on the same strip, the information on the preceding rolling path being information which includes a roll shift amount, and the attribute information on the same strip being information which includes at least one of a target strip crown, a target flatness, and a target temperature of the strip;

storing the adaptive model construction data;
constructing the adaptive model using the adaptive model construction data;
storing an adapted model, which is the adaptive model that has been constructed;
collecting prediction data used to predict the occurrence of the strip chew, by collecting, as the prediction data, data which includes information on one or more preceding rolling paths preceding the object rolling path in rolling order, which is obtained when a prediction object strip is rolled in the one or more preceding rolling paths, and the attribute information on the same strip;

predicting, during a hot rolling process which is after start of operation of the hot rolling process, before the prediction object strip reaches the object rolling path, the occurrence of the strip chew by inputting the prediction data to the adapted model, while the tail end of the strip has not meandered at the preceding rolling path preceding the object rolling path in the rolling order, by predicting in real-time the occurrence or non-occurrence of the strip chew in the object rolling path and all or some of the occurrence points of the strip chew, based on the prediction data collected at the preceding rolling paths preceding two or more from the object rolling path, in which the tail end of the strip has not meandered at the preceding rolling paths; and controlling to open an entrance side guide of the object rolling path before the prediction object strip passes the entrance side guide of the object rolling path, based on the predicted occurrence of the strip chew, to avoid collision of the tail end of the strip with the entrance side guide of the object rolling path.

13. A non-transitory computer-readable storage medium including computer executable instructions, wherein the instructions, when executed by an information processing system, cause the information processing system to perform a method, the method comprising:

collecting the adaptive model construction data used to construct an adaptive model for predicting occurrence of a strip chew in a hot rolling mill in which a strip-like metal material is heated to a high temperature and rolled through a plurality of rolling paths, the strip chew being a phenomenon in which a tail end of a strip is bent by colliding with an entrance side guide of at least one of the plurality of rolling paths due to a meander of the strip under the at least one of the plurality of rolling paths, by collecting a plurality of sets of first data and second data as the adaptive model construction data, the first data being data which indicates the occurrence or non-occurrence of the strip chew in an object rolling path which is an object of strip chew occurrence prediction and an occurrence point of the strip chew, the second data being data which includes information on a preceding rolling path preceding the object rolling path in rolling order, which is obtained when a strip linked to the first data is rolled in the preceding rolling path, and attribute information on the same strip, the information on the preceding rolling path being information which includes a roll shift amount, and the attribute information on the same strip being information which includes at least one of a target strip crown, a target flatness, and a target temperature of the strip;

storing the adaptive model construction data;

constructing the adaptive model using the adaptive model construction data;

storing an adapted model, which is the adaptive model that has been constructed;

collecting prediction data used to predict the occurrence of the strip chew, by collecting, as the prediction data, data which includes information on one or more preceding rolling paths preceding the object rolling path in rolling order, which is obtained when a prediction object strip is rolled in the one or more preceding rolling paths, and the attribute information on the same strip;

predicting, during a hot rolling process which is after start of operation of the hot rolling process, before the prediction object strip reaches the object rolling path, the occurrence of the strip chew by inputting the prediction data to the adapted model, while the tail end of the strip has not meandered at the preceding rolling path preceding the object rolling path in the rolling order, by predicting in real-time the occurrence or non-occurrence of the strip chew in the object rolling path and all or some of the occurrence points of the strip chew, based on the prediction data collected at the preceding rolling paths preceding two or more from the object rolling path, in which the tail end of the strip has not meandered at the preceding rolling paths; and controlling to open an entrance side guide of the object rolling path before the prediction object strip passes the entrance side guide of the object rolling path, based on the predicted occurrence of the strip chew, to avoid collision of the tail end of the strip with the entrance side guide of the object rolling path.

\* \* \* \* \*